United States Patent [19]
Core et al.

[11] Patent Number: 5,432,844
[45] Date of Patent: Jul. 11, 1995

[54] SHARED LINE ANSWERING SYSTEM WITH ENHANCED EXTENSION DEVICE FEATURES

[75] Inventors: Kenneth R. Core, Stanton; Mark J. Karnowski, Garden Grove; Stephen B. Knuth, Mission Viejo, all of Calif.

[73] Assignee: PhoneMate, Inc., Torrance, Calif.

[21] Appl. No.: 252,954

[22] Filed: Jun. 1, 1994

Related U.S. Application Data

[63] Continuation of Ser. No. 904,984, Jun. 26, 1992, abandoned.

[51] Int. Cl.⁶ .......................................... H04M 11/02
[52] U.S. Cl. ..................................... 379/67; 379/374; 379/217; 379/77; 379/171
[58] Field of Search ............... 379/374, 217, 376, 375, 379/157, 159, 160, 77, 171, 182, 183, 184, 161

[56] References Cited

U.S. PATENT DOCUMENTS

| | | | |
|---|---|---|---|
| 3,033,932 | 5/1962 | Lomax | 379/184 |
| 4,001,508 | 1/1977 | Johnson | 179/6 D |
| 4,444,999 | 4/1984 | Sparrevohn | 379/195 |
| 4,451,707 | 5/1984 | Hanscom | 179/84 R |
| 4,625,079 | 11/1986 | Castro | 379/77 |
| 4,653,089 | 3/1987 | Eydelman | 379/183 |
| 4,703,499 | 10/1987 | Fossas et al. | 379/194 |
| 4,737,979 | 4/1988 | Hashimoto | 379/82 |
| 4,741,024 | 4/1988 | Del Monte | 379/181 |
| 4,782,518 | 11/1988 | Mattley | 379/201 |
| 4,788,714 | 11/1988 | Hashimoto | 379/77 |
| 4,805,210 | 2/1989 | Griffith | 379/184 |
| 4,891,834 | 1/1990 | Sezaki et al. | 379/67 |
| 4,893,334 | 1/1990 | Parnello | 379/157 |
| 4,916,732 | 4/1990 | Kotani et al. | 379/100 |
| 4,922,526 | 5/1990 | Morganstein | 379/157 |
| 4,926,461 | 5/1990 | Kuok | 379/88 |
| 4,941,166 | 7/1990 | Waldman et al. | 379/67 |
| 4,958,370 | 9/1990 | Shimanuki | 379/157 |
| 4,998,273 | 3/1991 | Nichols | 379/102 |
| 5,056,132 | 10/1991 | Coleman et al. | 379/95 |
| 5,086,458 | 2/1992 | Bowen | 379/180 |
| 5,119,418 | 6/1992 | Dupillier | 379/373 |
| 5,125,026 | 6/1992 | Holcombe | 379/171 |

OTHER PUBLICATIONS

Brochure entitled "Only one phone line?" published by PhoneMate, Inc. of Torrance, California, Aug., 1991.
Brochure entitled "PAM Private Answering Machine" published by PhoneMate, Inc. of Torrance, California, May, 1991.
Brochure entitled "PAM-2 Private Answering Machine" published by PhoneMate, Inc. of Torrance, California, Dec., 1991.

*Primary Examiner*—James L. Dwyer
*Assistant Examiner*—Michael N. Lau
*Attorney, Agent, or Firm*—Frishauf, Holtz, Goodman & Woodward

[57] ABSTRACT

A system of telephone answering devices includes a master telephone answering device (MTAD) and at least one (and often a plurality) of extension telephone answering devices (ETADs). If a telephone call is answered by someone, others nearby may be paged through the ETADs from any telephone. The ETADs can be temporarily disarmed so that they do not respond to tone codes that might otherwise activate them. When activated, the ETADs transmit back to the caller noticeably different ringback signals to indicate that the activated ETAD is responding to the caller's commands. For telephone utilities offering a distinctive ring service, the ETADs may respond to distinctive rings corresponding to the ETADs by usurping the function of and disabling the MTAD and by subsequently answering the telephone call.

12 Claims, 2 Drawing Sheets

SHARED LINE ANSWERING SYSTEM WITH ENHANCED EXTENSION DEVICE FEATURES

This application is a Continuation of application Ser. No. 07/904,984, filed Jun. 26, 1992, now abandoned.

BACKGROUND OF THE INVENTION

1. Field of the Invention

This invention relates to telephone answering devices, and more particularly to a system of telephone answering devices that are able to uniquely and interactively access a single telephone line shared between them with enhanced operating features.

2. Description of the Related Art Including Information Disclosed Under 37 C.F.R. §§ 1.97-1.99

Telephone answering devices (TADs) began replacing operator exchanges for answering telephones with the increased presence of consumer electronics in the open marketplace. Since the 1960's, the number of TADs has increased significantly, especially in homes and residences.

Previously, only a single TAD would be connected to a single telephone line as there was no way to allow the single telephone line to be shared between two TADs. If two TADs were connected to the same telephone line, the two TADs would independently answer an incoming telephone call. Both might simultaneously play back their outgoing greeting messages to the caller, and then both would simultaneously record the caller's incoming message. The problems with such an arrangement are obvious. The caller may be confused and there is no way the caller can maintain the privacy of the call by having it recorded by only one of the TADs.

One solution to this problem is to have a single telephone line for each individual. In this way, privacy is maintained for a caller's incoming message as the caller must direct the call by entering a specific telephone number. This solution has several disadvantages due to the significant cost to install individual lines, the wiring requirements inside any established building, and the caller must recall the number for each of the several persons associated with each of the several telephones. Furthermore, a telephone answering device (TAD) must be purchased for each line, such a telephone answering device costing an additional significant amount.

In order to overcome some of these problems, a system was developed that allowed several individuals to share the same telephone line and to keep private all the incoming telephone messages. U.S. patent application Ser. No. 07/671,504, filed on Mar. 19, 1991 by Becker and Mayer entitled SHARED LINE TELEPHONE ANSWERING DEVICE sets forth such a system and is incorporated herein by this reference.

In the Becker and Mayer device, a regular TAD may act as a central or master TAD (MTAD) while a number of modified extension TADs (ETADs) are connected to and share the same telephone line as the MTAD. When an incoming call is answered by the MTAD, the caller can be instructed as to the available options for leaving a message upon the MTAD or one of the ETADs. The default response of the system is for the caller to leave a message on the MTAD. In this way, even if the caller does not understand the instructions, the call is not lost. The caller may intentionally choose to leave a message on the MTAD without leaving a message on any of the ETADs. If so, the MTAD acts as a typical TAD by greeting the caller with a pre-recorded message, recording the caller's message, and then resetting itself to receive the next call.

If the caller should choose to leave a message on one of the ETADs sharing the telephone line, the caller selects the specific ETAD by transmitting one or more of the tones associated with one of the keypad buttons on pushbutton (i.e., touch tone) telephones. Each of the ETADs has a unique specifying tone code that activates the ETAD when its code is received. In order to prevent both an activated ETAD and the MTAD from recording the caller's message, the code (or at least part of it, such as a prefix) which activates the chosen ETAD also serves to temporarily disconnect the MTAD from the telephone line. A disconnect module connected between the MTAD and the telephone line recognizes tone codes transmitted by the caller so that it can temporarily disconnect the MTAD from the shared telephone line.

With the Becker and Mayer MTAD/ETAD system, a family or business can have several TADs independently and separately capable of storing messages intended for a specific party or person. Not only does the system promote proper routing of a message to a person, but it also promotes privacy. Each party has an individual TAD connected to the shared telephone line, yet each party has the same privacy as if each individual TAD were connected to its own telephone line. Further, this individual privacy does not require the additional cost of separate lines.

The MTAD/ETAD system presents advantages over previous telephone answering device systems and further advancements have been made that enhance the operation of the system, making it more attractive to the ultimate consumer by expanding the capabilities of the system. Further, certain areas of operation which had previously presented problems have been addressed to increase the convenience and utility of the system.

SUMMARY OF THE INVENTION

The MTAD/ETAD system has been enhanced so that the ongoing user of the system can more fully realize and put to use the potential of the system.

An intuitive operating structure has been implemented so that those who use the MTAD/ETAD system will become more comfortable with the system sooner, and so will be able to use the system more easily and more effectively.

The MTAD and associated ETADs can activate and allow communications between one another so that incoming telephone calls can be forwarded and so that persons who are physically far apart can communicate through the MTAD/ETAD system. When calls are forwarded by using a paging feature, a short voice announcement by the person answering the phone call can precede the transfer of the call to the person at the activated ETAD/MTAD.

As some tone codes may also activate or inhibit certain operations, for example when accessing outside voice mail systems such as might be present at the local bank, means by which ETAD/MTAD response can be temporarily suppressed are present that add to the convenience and utility of the system.

In order to signal the caller that a certain ETAD has been activated, a ringback signal is transmitted to the caller to acknowledge the receipt of an ETAD activating tone.

Certain telephone lines now offer a service called "distinctive ring" that allows more than one telephone number to access the same telephone line. In order to indicate through which telephone number an incoming call has been placed, the telephones on the called end are made to ring in differing ring cadences with a specific ring cadence corresponding to a certain telephone number. The ETADs on the system can be made to respond to these distinctive rings so that not only can a caller activate an ETAD through the "main" telephone number, the caller can also direct the call to the ETAD or person the caller is most interested in calling.

OBJECTS OF THE INVENTION

It is an object of this invention to provide a paging feature in an MTAD/ETAD system.

It is an object of this invention to temporarily disable an ETAD in an MTAD/ETAD system.

It is an object of this invention to provide feedback to a caller with respect to the operational status of an ETAD and the MTAD/ETAD system.

It is an object of this invention to provide distinctive ringing recognition and response capacity in ETADs and in an MTAD/ETAD system.

It is an object of this invention to provide an enhanced MTAD/ETAD system.

It is an object of this invention to provide an enhanced MTAD/ETAD system that is easier to use, more powerful, and more efficient.

It is an object of this invention to expand the capabilities of the MTAD/ETAD system by providing more options to the caller and to the users of the system.

These and other objects and advantages of the present invention will be apparent from a review of the following specification and accompanying drawings.

DESCRIPTION OF THE PREFERRED EMBODIMENTS

Figure 1:
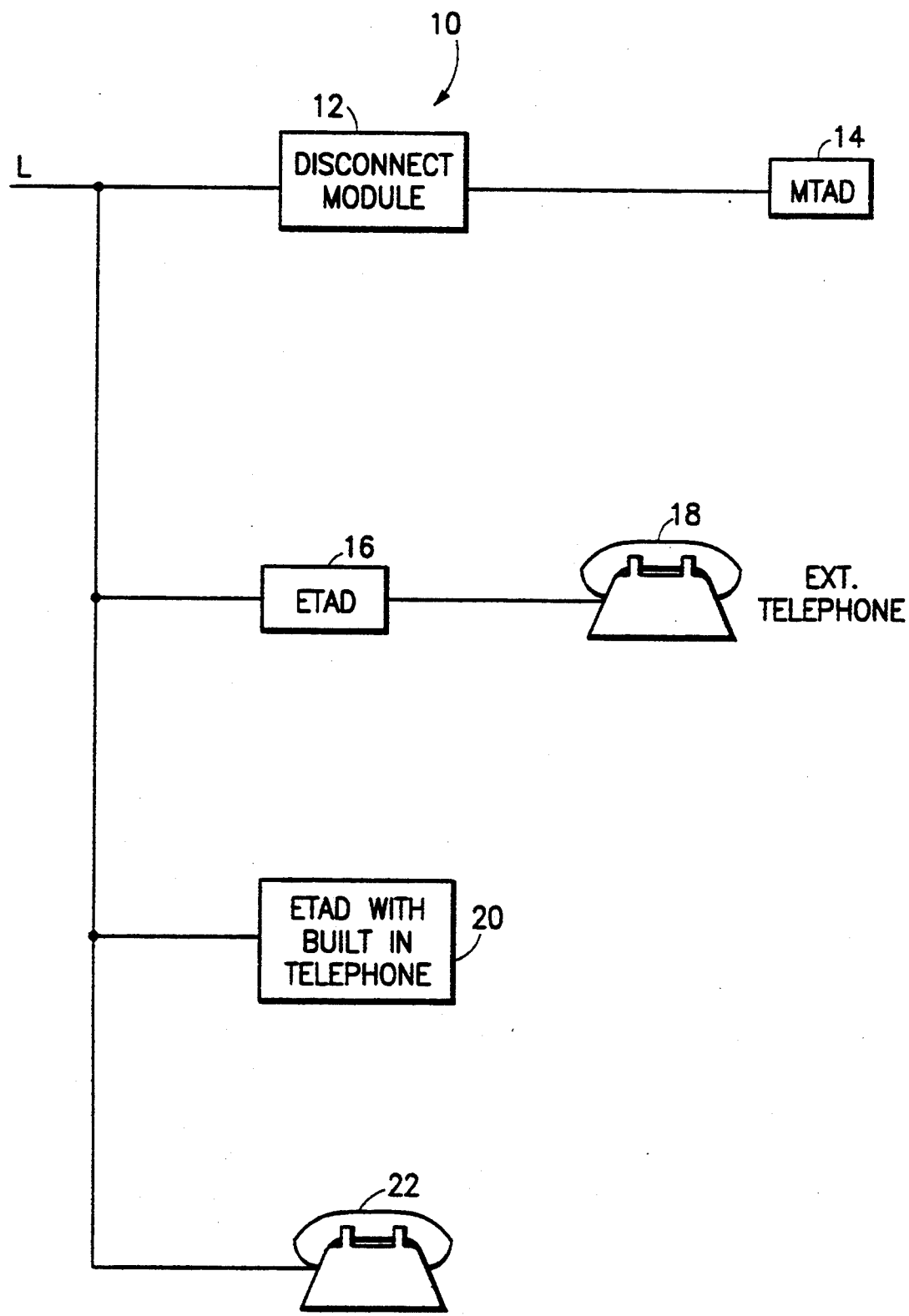
FIG. 1 is a block diagram showing the overall structure of the MTAD/ETAD system.

As shown in FIG. 1, a telephone line L supplied by a telephone utility is connected to several telephone-related devices. These connected devices are part of the MTAD/ETAD system (generally indicated by reference number 10) enhanced by the present invention.

Connected to the telephone line L is a disconnect module 12. Connected to the disconnect module 12 is a master telephone answering device (MTAD) 14 which initially answers an incoming telephone call.

An ETAD unit 16 is also connected to the telephone line L. The ETAD unit 16 serves to mediate incoming telephone calls by recognizing specific activating signals that engage the operation of the ETAD 16. Connected to the ETAD 16 is an extension telephone 18.. The extension telephone 18 operates normally although the ETAD 16 is connect between it and the telephone line L.

As an alternative to an ETAD 16 with an extension telephone 18, a telephone ETAD 20 can be connected to the telephone line L. The telephone ETAD 20 combines both an ETAD and a telephone into a single, convenient unit.

The operation of the telephone line L serving the MTAD/ETAD system 10 is not altered significantly and operates as a typical telephone line. As the MTAD-/ETAD system 10 does not alter the function of the telephone line L, telephones 22 can be connected in the typical manner to the telephone line L and operate normally.

Figure 2:
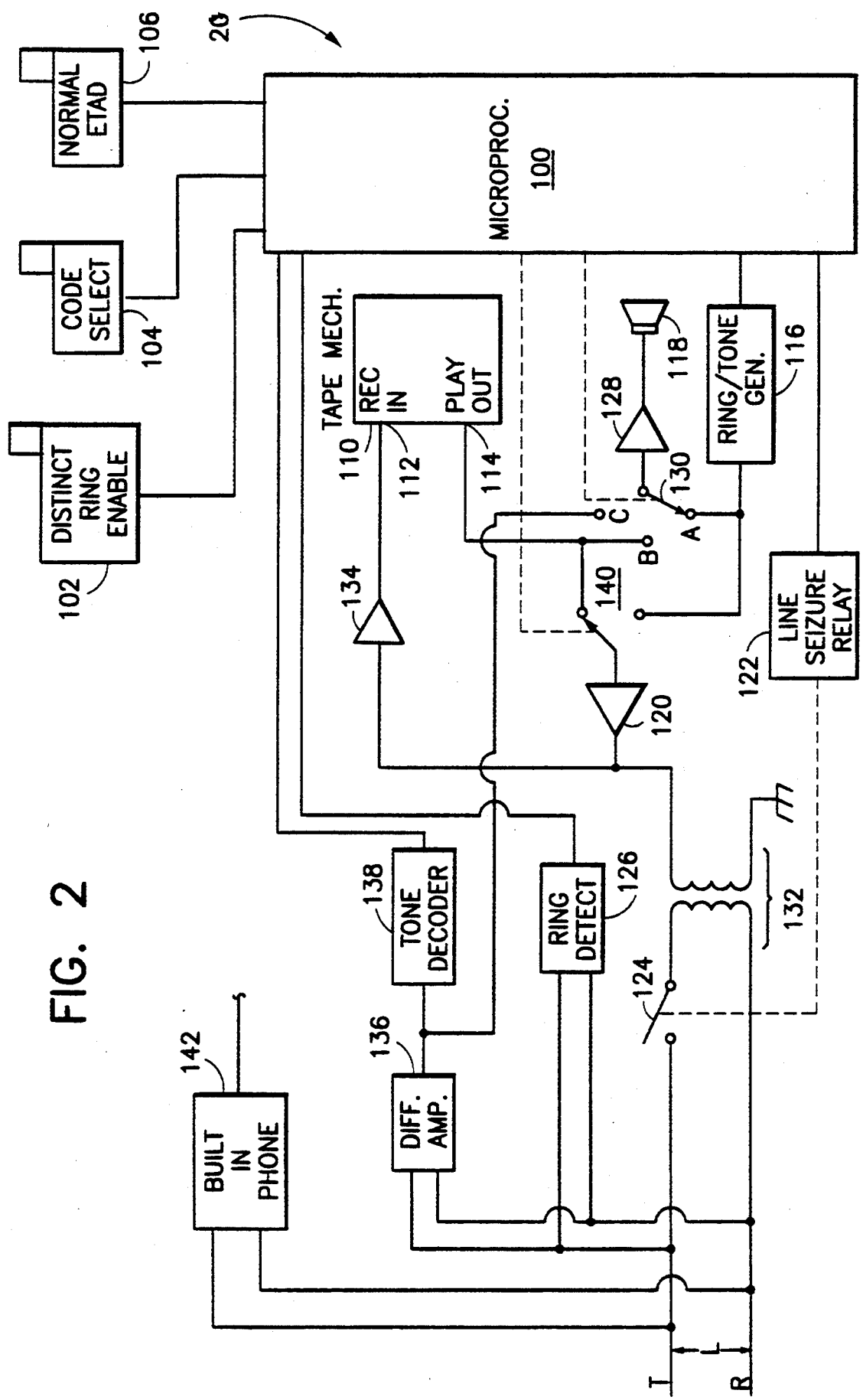
FIG. 2 is a schematic block diagram showing the circuitry of an ETAD with a built-in telephone.

FIG. 2 is a schematic block diagram of the telephone ETAD 20 shown in FIG. 1. At the core of the telephone ETAD 20 is a software-driven microprocessor 100 having internal memory (either ROM, RAM, or both) used by the microprocessor 100 to store instructions and other information.

Different operating modes of the telephone ETAD 20 are controlled by a set of switches connected to the microprocessor 100. A distinctive ring enable switch 102 enables or disables the distinctive ring feature of the telephone ETAD 20. A code select switch 104 determines the tone codes which identify the telephone ETAD 20 and to which the telephone ETAD 20 responds. A third normal/ETAD switch 106 controls the operation of the telephone ETAD 20 so that it can operate as a normal telephone answering device (TAD) with the ETAD option disabled, or as a telephone ETAD with the ETAD option enabled.

A recording mechanism 110 is also connected to and controlled by the microprocessor 100. The recording mechanism 110 records incoming and outgoing messages on tape, in digital memory, or by other recording means. The recording mechanism 110 has an input 112 for recording messages and an output 114 for playing messages back.

A ring/tone generator 116 is connected to and controlled by the microprocessor 100. The ring/tone generator 116 generates rings and/or tones for local broadcast through an audio speaker 118 and/or to the telephone line L through a line amplifier 120.

A line seizure relay 122 is connected to and controlled by the microprocessor 100. The line seizure relay 122 controls the operation of line relay contacts 124 in order to maintain a connection on the telephone line L. The line relay contacts 124 are connected with either the tip T or ring R lines of the telephone line L.

A ring detect circuit 126 is connected to the microprocessor 100 and the telephone line L. The ring detect circuit 126 signals the microprocessor when a ring signal is on the line. Through instructions driving the microprocessor 100, the telephone ETAD 20 is able to recognize distinctive rings. If the distinctive ring option is enabled by the proper setting of the distinctive ring enable switch 102, the telephonic ETAD 20 is activated when the appropriate distinctive ring is detected.

The audio speaker 118 is driven by a signal that passes through a speaker amplifier 128. The signal that drives the audio speaker 118 may be transmitted from the ring/tone generator 116, the playback output 114 of the recording mechanism 110, or a signal 10 coming in from the telephone line L. A speaker switch 130 is controlled by the microprocessor 100 and has terminals A, B, and C that control the signal passed to the audio speaker 118.

Signals from the telephone line L are transmitted to and from the recording mechanism 110 through a transformer 132. The transformer 132 is connected on the telephone line L side to the tip T and ring R lines of the telephone line L, and is connected on the ETAD side to the recording input 112 of the recording mechanism 110 through a recording amplifier 134 and to ground. The transformer 132 serves to eliminate any DC bias that may be present while allowing to pass any alternating signal, such as a voice signal.

A differential amplifier 136 is connected to both the tip T and ring R lines of the telephone line L, from which the differential amplifier 136 derives its input. The differential amplifier 136 transmits its output to both a tone decoder 138 and to terminal C of the speaker switch 130. The tone decoder 138 monitors its input for DTMF tone codes and transmits the results to the microprocessor 100 so that tone codes can be recognized and acted upon by the microprocessor 100. With this approach, the ETAD is able to monitor the audio and tone signals on the line without having to seize the telephone line L.

The line amplifier 120 is switchably connected to either the ring/tone generator 116 or the playback output 114 of the recording mechanism 110 through the line switch 140, which is controlled by the microprocessor 100.

A built-in telephone 142 is also connected to the tip T and ring R lines of the telephone line L and operates as would any regular telephone. The ETAD 16 of FIG. 1 is similar to the telephonic ETAD 20 except that the ETAD 16 has no built-in telephone 142.

The operation of the telephone ETAD 20 is disclosed in the previously mentioned patent application by Becker and Mayer, which is incorporated herein by reference.

There are four operational enhancements of the ETAD 16/telephonic ETAD 20 of the present invention: page mode, disarm, phantom ringback, and distinctive ring.

Use of the page mode in the MTAD/ETAD system 10 arises under the following circumstances. When an incoming call arrives, a first person may answer the ringing telephone (i.e., telephone 18 or 22 or the telephone built into ETAD 20) before the MTAD 14 has had the opportunity to answer the call. When the call is answered, it could have been intended for a second person who is nearby but not near the first telephone. In order to signal the second person (who answered the call) that the call is for him or her, the first person (who answered the call) can press the tone codes for either that second person's ETAD 16 (for example, the touch tone "*" key followed by the number tone for that person's ETAD) or may generally page that person throughout the MTAD/ETAD system 10 by pressing, for example, the touch tone "*" key followed by the touch tone "#" key.

When the first person enters the tones, they are transmitted throughout the connected lines and are detected by the caller and by the connected MTAD 14 and ETADs 16, 20. Depending on the tones, the ETADs 16, 20 may or may not respond to the tones. For the specific page tone code ("*" plus the signifying code) only that ETAD corresponding to the signifying code would respond. For the general page ("*" plus "#"), all the ETADs 16, 20 would respond.

For either specific or general page modes, the ETADs respond by first decoding the tone signals and determining whether or not to respond to the incoming signal. For the specific page mode, only one ETAD 16 may respond. The other ETADs 20 ignore the tone code signal as the tone code is not recognized by said other ETADs 20 to activate them. For the general page mode, all ETADs 16, 20 respond. When an ETAD 16 and/or 20 is/are activated by paging (specific or general paging), the response is the same for either specific or general modes and the explanation of the page activation of one ETAD is the same for all ETADs.

Upon receiving any tone code signal, the ETAD 16 receives the tone code through the differential amplifier 136 and tone decoder 138. If the tone code is recognized as the page signal, the microprocessor 100 activates the ring/tone generator 116 and controls the speaker switch 130 to transmit beeps or other tones through the audio speaker 118 to signal that there is a call. The microprocessor 100 then controls speaker switch 130 to connect the differential amplifier output to the speaker 118. If the first person who initially answered the telephone call chooses to speak, the beeps or other tones generated by the ring/tone generator 116 are heard through the audio speaker 118, and thereafter the voice of the first person is heard through the audio speaker 118 as the other person is paged. By allowing the first person who originally answered to verbally page the other called person (via the audio speaker 118), greater utility is provided by the MTAD/ETAD system 10.

If the other called person is present and takes the call, the first person can just hang up. The call will then have been transferred to the other called party in a simple and efficient manner. If the other called person does not respond, the first person enters a second tone code that can be specific to an ETAD corresponding to the called person.

When the second tone code is detected by the intended ETAD, that ETAD becomes active and engages in the process by which the caller's message can be privately recorded on the ETAD 16. First, the line seizure relay 122 of that ETAD 16 closes the relay 124 to maintain the telephone call once the first person has hung up the telephone. The recording mechanism 110 becomes active and records the caller's incoming message by first playing an outgoing message (OGM) and then recording the caller's message. In the alternative, a timer can be used with or within the microprocessor 100 or otherwise, that activates the ETAD 16 to record the caller's message if a/the telephone has not been picked up in response to the first person's page.

For the disarm feature of the MTAD/ETAD system 10, it is occasionally advantageous to temporarily disable the ETAD 16 from responding to all tones. One example of this arises when people access automated bank records or voice mail systems over the telephone.

To disarm an ETAD 16, the user presses a specific tone code combination (for example, "#5"). By transmitting this tone code to the ETAD 16, the microprocessor 100 recognizes the tone 10 code and subsequently ignores any input from the tone decoder 138 until the ringing detect circuit 126 signals an incoming call.

Alternatively, the microprocessor could await another specific tone code to re-activate normal ETAD functioning and enable tone code recognition by the microprocessor 100. When disarmed, the user can transmit any tone codes to the ETAD 16 without the ETAD 16 responding.

For the phantom ringback mode a signal is generated by the ETAD 16 to indicate that a command has been received and that the ETAD 16 is executing that command. When the tone decoder 138 and microprocessor 100 detect the ETAD's activating code, the microprocessor 100 activates the line seizure relay 122 to establish a connection with the telephone line L. The line switch 140 is engaged by the microprocessor 100 so that the ring/tone generator 116 is connected to the telephone line L through the line amplifier 120 and the transformer 132. The microprocessor 100 then activates the ring/tone generator 116 to transmit ring signals to the telephone line L. Preferably, the rings generated by the ring/tone generator 116 are noticeably different than the ring signals used by the telephone utility.

In hearing the ring signals different from the telephone utility ring signals, the caller is assured that the call has been received and maintained by an ETAD 16 and that the call is being processed. With this phantom ringback feature, the MTAD/ETAD system emulates a call transfer feature known in voicemail and/or PBX systems so that a familiar aural interface is presented to the caller.

With the telephonic ETAD 20, the built-in telephone 142 is preferably designed to generate a ring with a different sound than that of a regular ring before the telephonic ETAD 20 answers the incoming call. With this different ring that is both transmitted to the caller and broadcast through the audio speaker 118, the person to whom the telephonic ETAD 20 corresponds is notified that the call is specifically for him or her. The telephonic ETAD 20 can then be answered by that person before the recording mechanism 110 thereof is engaged, knowing that the call is for him or her.

With the distinctive ring feature of the MTAD/ETAD system 10, telephone lines enjoying the distinctive ring feature sometimes accorded to customers can be used to direct the incoming telephone call to the intended person. When the distinctive ring feature is engaged, the ETADs 16, 20 do not respond to normal rings, but instead allow the MTAD 14 to answer as for normal operation. When an ETAD 16 detects a distinctive ring assigned to that ETAD 16, the ETAD 16 directly answers the call and disables the MTAD.

The distinctive ring feature of the ETAD 16 is controlled by its distinctive ring enable switch 102. Within an MTAD/ETAD system 10, each ETAD could have its own distinctive ring assigned to it. The microprocessor 100 recognizes the distinctive ring and responds by disabling the MTAD and directly answering the telephone call. For the telephonic ETAD 20, the built-in telephone could be made to ring in a special manner to indicate that a distinctive ring has been detected on an incoming call by the telephonic ETAD 20.

While the present invention has been described with regards to particular embodiments, it is recognized that additional variations of the present invention may be devised without departing from the inventive concept.

What is claimed is:

1. A telephone answering device system for use with a telephone line having a telephone connected to the telephone line, the answering device system comprising:
    a master telephone answering device (MTAD) coupled to the telephone line for receiving and answering calls on said telephone line; and
    at least one extension telephone answering device (ETAD) coupled to said telephone line and also coupled to said MTAD via said telephone line;
    paging code means, including touch tone keys in at least one of said telephone and said ETAD, for sending out on said telephone line any of a plurality of audible touch tone signals as paging codes; and
    said at least one ETAD including means responsive to a predetermined audible touch tone signal paging code sent out by said paging code means for being activated to broadcast an audible paging signal upon detection of said predetermined audible touch tone signal paging code to alert a user being paged.

2. The telephone answering device system of claim 1, wherein said predetermined audible touch tone signal paging code is a specific paging code which activates only a specific ETAD.

3. The telephone answering device system of claim 1, wherein:
    said at least one ETAD comprises a plurality of ETADs coupled to said telephone line; and
    said plurality of audible touch tone signal paging codes includes a general paging code which activates all of said plurality of ETADs to broadcast an audible general paging signal.

4. The telephone answering device system of claim 1, wherein said at least one ETAD includes means responsive to said predetermined audible touch tone signal paging code for broadcasting at least one audible tone as said audible paging signal.

5. The telephone answering device system of claim 1, wherein said at least one ETAD includes means for broadcasting a voice message as said audible paging signal.

6. The telephone answering device system of claim 1, wherein said at least one ETAD includes means responsive to an audible touch tone code, transmitted by a person paging, for recording a caller's message.

7. A telephone answering device system for use with a telephone line having a telephone connected to the telephone line, comprising:
    a master telephone answering device (MTAD) coupled to the telephone line; and
    at least one extension telephone answering device (ETAD) coupled to said telephone line and also coupled to said MTAD via said telephone line;
    wherein said at least one ETAD includes disarming means responsive to an audible touch tone code input onto said telephone line by a user for temporarily ignoring subsequent audible touch tone codes on said telephone line, thereby causing said at least one ETAD to take a disarmed state.

8. The telephone answering device system of claim 7, wherein said at least one ETAD ignores said subsequent audible touch tone codes on said telephone line until said at least one ETAD receives a ring signal on said telephone line, said disarming means being reset to release said disarmed state responsive to receiving a ring signal.

9. The telephone answering device system of claim 7, wherein said at least one ETAD ignores said subsequent audible touch tone codes on said telephone line until said disarming means of said at least one ETAD receives a re-arming audible touch tone code on said telephone line.

10. The telephone answering device system of claim 1, further comprising:
    means for transmitting a ringback signal to a caller to indicate that said at least one ETAD has been activated; and
    wherein said at least one ETAD includes means for producing an audible ringing sound which is noticeably different from a normal audible ringing sound when said at least one ETAD has been activated.

11. The telephone answering device system of claim 1, wherein said at least one ETAD further includes means for responding immediately to distinctive audible ring signals of an incoming telephone call corresponding to said at least one ETAD, and for disabling said MTAD and answering said telephone call responsive to said distinctive audible ring signals.

12. The telephone answering device system of claim 1, wherein:

said at least one ETAD further comprises a built-in telephone; and said built-in telephone includes means for producing an audible ringing sound which is noticeably different from a normal audible ringing sound responsive to distinctive ring signals which accompany an incoming telephone call.

* * * * *